United States Patent
Kii

(10) Patent No.: US 8,339,397 B2
(45) Date of Patent: Dec. 25, 2012

(54) METHOD AND APPARATUS FOR HIGH-SPEED SHADOWING USING SHADOW VOLUMES

(75) Inventor: Yasuyuki Kii, Yamatokooriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 10/797,743

(22) Filed: Mar. 9, 2004

(65) Prior Publication Data

US 2004/0179009 A1   Sep. 16, 2004

(30) Foreign Application Priority Data

Mar. 10, 2003  (JP) .................................. 2003-63060

(51) Int. Cl.
 *G06T 15/40* (2011.01)
 *G06T 15/00* (2011.01)
(52) U.S. Cl. .................... 345/422; 345/421; 345/419
(58) Field of Classification Search .................. 345/422, 345/426
 See application file for complete search history.

(56) References Cited

U.S. PATENT DOCUMENTS

| | | | | |
|---|---|---|---|---|
| 5,043,922 | A * | 8/1991 | Matsumoto | 345/422 |
| 5,517,603 | A * | 5/1996 | Kelley et al. | 345/426 |
| 6,356,264 | B1 * | 3/2002 | Yasui et al. | 345/426 |
| 6,384,822 | B1 * | 5/2002 | Bilodeau et al. | 345/422 |
| 6,402,615 | B1 * | 6/2002 | Takeuchi | 463/31 |
| 6,744,430 | B1 * | 6/2004 | Shimizu | 345/420 |
| 6,897,865 | B2 * | 5/2005 | Higashiyama | 345/426 |
| 6,903,741 | B2 * | 6/2005 | Corbetta | 345/426 |
| 2001/0024201 | A1 | 9/2001 | Hino et al. | |
| 2002/0060687 | A1 | 5/2002 | Tsukizaki et al. | |

FOREIGN PATENT DOCUMENTS

| | | |
|---|---|---|
| JP | 1-46915 B2 | 6/1986 |
| JP | 07-065198 | 3/1995 |
| JP | 2001-307128 | 11/2001 |
| JP | 2002-157604 | 5/2002 |
| JP | 2002-298158 | 10/2002 |

OTHER PUBLICATIONS

Franklin C. Crow. 1977. Shadow algorithms for computer graphics. SIGGRAPH Comput. Graph. 11, 2 (Jul. 1977), 242-248.*
Cass Everitt, Mark J. Kilgard. Practical and Robust Stenciled Shadow Volumes for Hardware-Accelerated Rendering. Mar. 12, 2002. Published on-line at developer.nvidia.com.*
"Monthly C Magazine 2001 8" published by SOFTBANK Publishing Inc. in Aug. 2001, pp. 30-32.

* cited by examiner

*Primary Examiner* — Kee M Tung
*Assistant Examiner* — Zhengxi Liu
(74) *Attorney, Agent, or Firm* — Edwards Wildman Palmer LLP; David G. Conlin; Steven M. Jensen

(57) ABSTRACT

Appropriate shadowing processing is performed even if coordinate conversion calculation values of polygons have errors. A calculation section 5 performs hidden surface removal processing on normal polygons based on visual-point coordinates and depth values from a visual-point coordinate conversion processing unit 1, and updates a pixel memory 6 and a Z-buffer memory 7. Further, based on a comparison result of obtained depth values of each polygon and Z values stored in the Z-buffer memory 7, shadowing is performed only on a coordinate region positioned in front of back-facing shadow polygons and behind front-facing shadow polygons when seen from a visual point, and the pixel memory 6 is updated. As a result, even if coordinate conversion calculation values in graphic data on polygons have errors, an edge portion of the shadow polygons which is not intended to be shadowed is not shadowed.

11 Claims, 13 Drawing Sheets

METHOD AND APPARATUS FOR HIGH-SPEED SHADOWING USING SHADOW VOLUMES

This nonprovisional application claims priority under 35 U.S.C. §119(a) on Patent Application No. 2003-063060 filed in Japan on Mar. 10, 2003, the entire contents of which are hereby incorporated by reference.

BACKGROUND OF THE INVENTION

The present invention relates to a graphic processing apparatus, a graphic processing method, a graphic processing program and a program storage medium, which allow high-speed shadowing of three-dimensional objects with simple constitution.

Conventionally, a graphic processing apparatus for performing shadowing of three-dimensional objects includes an apparatus for hidden surface removal by Z-buffer method or scan line Z-buffer method, which adopts a shadowing processing with use of a shadow polygon (see first prior art: JP 01-46915 B).

This graphic processing apparatus includes a frame buffer memory for storing luminance and color data per pixel, a Z-buffer memory for storing a depth Z per pixel, and a counter memory for counting shadow levels. The shadowing of three-dimensional objects is performed as follows.

First, hidden surface removal processing by Z-buffer method is carried out so as not to display planes hidden by foreground objects when seen from a visual point in three-dimensional graphic display. More specifically, the frame buffer memory is filled with a background color and the Z-buffer memory is filled with a maximum depth value. Then, planar polygons ABC, ADB, BDC and ADC of a polyhedron Q in FIG. 12 are converted to visual-point coordinate systems, and for each pixel of each planar polygon, a depth $Z(i, j)$ corresponding to the coordinate $(i, j)$ of the pixel is compared with a depth $Z_M(i, j)$ stored in the Z-buffer memory. If $Z_M(i, j) > Z(i, j)$, then a value $I(i, j)$ of the frame buffer memory is replaced with color data (including luminance) $C(i, j)$ of the pixel $(i, j)$ in the polyhedron Q, and a value $Z_M(i, j)$ of the Z-buffer memory is replaced with a depth $Z(i, j)$ of the pixel $(i, j)$. If $Z_M(i, j) \leq Z(i, j)$, then values $I(i, j)$ and $Z_M(i, j)$ in the frame buffer memory and Z-buffer memory are not updated.

Thus, planes (planar polygons and a background) hidden by foreground objects (planar polygons) are erased so as not to be displayed. As a result, as shown in FIG. 12, a background that is behind the polyhedron Q when seen from a visual point is replaced with the polyhedron Q.

Next, shadow polygons AEFB, CBFG, AEGC that define a shadow space produced by obstructing a ray of light from a light source P with the polyhedron Q are obtained and converted to visual-point coordinate systems. Then, the converted shadow polygons AEFB, CBFG, AEGC, and the planar polygons ADB, BDC among previously-obtained planar polygons of the polyhedron Q, which are back polygons when seen from the viewpoint of the light source P, are respectively sorted into front polygons and back polygons when seen from a visual point. In this case, the back planar polygon ADC when seen from a visual point is erased by the hidden surface removal processing, and so does not exist in reality. After that, the shadowing processing is performed.

That is, a value $C_u(i, j)$ (shadow level) of the counter memory is set to zero in advance. In this case, an end result of the depth $Z_M(i, j)$ obtained by the hidden surface removal processing is stored in the Z-buffer memory. Then, for each pixel of the shadow polygons AEFB, CBFG, AEGC, and the planar polygons ADB, BDC which are back polygons when seen from the viewpoint of the light source P, the depth $Z(i, j)$ of the pixel $(i, j)$ is compared with a value $Z_M(i, j)$ in the Z-buffer memory. Based on this comparison result, the shadow level of the counter memory is determined. This processing is performed on every overlap of the shadow polygons and the planar polygons which are back polygons when seen from the viewpoint of the light source P. More specifically, (a) in the combination of front shadow polygons (AEFB, CBFG) and planar polygons (ADB, BDC),
if $Z_S(i, j) \leq Z_M(i, j)$, then
$C_U(i, j) \leftarrow C_U(i, j)+1$,
if $Z_S(i, j) > Z_M(i, j)$, then
$C_U(i, j) = C_U(i, j)$.

(b) in the combination of the back shadow polygon (AEGC) and planar polygons (ADB, BDC),
if $Z_S(i, j) \leq Z_M(i, j)$, then
$C_U(i, j) \leftarrow C_U(i, j) - 1$,
if $Z_S(i, j) > Z_M(i, j)$, then
$C_U(i, j) = C_U(i, j)$.

After all the front and back shadow polygons and the planar polygons undergo the above-mentioned processings (a) and (b), a value $C_U(i, j)$ of the counter memory is read.
If $C_U(i, j) \geq 1$, then the following processing is performed:
$I(i, j) \leftarrow C_S$ (shadow color data).
If $C_U(i, j) = 0$, then the following processing is performed:
$I(i, j) = I(i, j)$.

By the above-stated processings, the shadowing processing is finished. As a result, on the planar polygons ADB, BDC among planar polygons of the polyhedron Q, which are back polygons when seen from the viewpoint of the light source P, there is cast a shadow produced by the planar polygon ABC which is a front polygon.

Further, the shadowing method with use of shadow polygons includes methods using functions of "OpenGL" (see second prior art: "Monthly C MAGAZINE 2001 8" published by SOFTBANK Publishing Inc. in August 2001, Pages 30-32) and "Microsoft DirectX". In these shadowing methods, a shadow volume that defines a shadow space produced by a ray of light from a light source being obstructed by an object is defined, as well as a stencil buffer is provided for performing a shadowing processing as follows. Provided below is a simple description about the shadowing method by OpenGL.

FIGS. 13A to 13G show operating results of a color buffer and a stencil buffer that are equivalent to the frame buffer in the aforementioned first prior art. It is to be noted that FIGS. 13A to 13D show contents of the color buffer, while FIG. 13F and 13G show contents of the stencil buffer. Like the first prior art, the hidden surface removal processing by Z-buffer method is performed to update the contents of the color buffer and the Z-buffer. As a result, as shown in FIG. 13A, a square planar polygon 101 and a curved planar polygon 102 to be shadowed are stored in the color buffer.

Consequently, first, graphic data on shadow polygons constituting a shadow volume is created so as to form a shadow volume 103 that is present between the planar polygon 101 and a virtual bottom surface (e.g., a plane at Y coordinate "0") and that consists of a space surrounded by a hexahedron without a ray of light coming therein as shown in FIG. 13 E. Next, front surface data of the shadow volume 103 is written onto the stencil buffer. More particularly, with regard to front-facing shadow polygons facing front when seen from a visual point, a "depth test" is carried out for determining whether or not depth values of the polygons are smaller than Z values in the Z-buffer memory, and as shown in FIG. 13F, a numeral "1" is written in a region of the front-facing shadow polygons where the result of the depth test is "true" in the stencil buffer. As a result, a portion of the front-facing shadow polygons shown in FIG. 13E that is lower than the planar polygon 102 as viewed in the figure is cut off.

Next, back surface data on the shadow volume 103 is written onto the stencil buffer. More particularly, with regard to back-facing shadow polygons facing back when seen from a visual point, the aforementioned depth test is carried out, and a numeral "−1" is added to a region of the back-facing shadow polygons where the result of the depth test is "true" in the stencil buffer. As a result, as shown in FIG. 13G, only a region 104 where the shadowed planar polygon 102 intersects with the shadow volume 103 has a value of "1" in the stencil buffer.

Finally, as shown in FIG. 13D, shadow color data is stored in a region 105 in the color buffer corresponding to the region 104 where the value of the stencil buffer is "1". Thus, a shadow of the planar polygon 101 is rendered on the curved planar polygon 102.

However, the shadowing method using the aforementioned prior art shadow polygons has a following problem. That is to say, in the graphic processing apparatus disclosed in the first prior art, assume the case where there is an object such as grounds on which a shadow of the polyhedron Q is cast (planar polygon HIJKLDM) in FIG. 12. In this case, as the planar polygon HIJKLDM is a front polygon when seen from the viewpoint of the light source P, a region EFG on the ground (HIJK) is not subjected to shadowing processing. Therefore, it is not possible to place a shadow of the polyhedron Q on the ground, the planar polygon HIJKLDM.

In the shadowing method using OpenGL function disclosed in the second prior art, it is possible to place a shadow of the object on a curved plane on which the shadow of the object should be cast. However, there is a problem that if calculation values of coordinate conversion for polygons have errors, an edge portion of the shadow polygons which is originally not intended to be shadowed is also shadowed.

For example, it is assumed that when the calculation values of coordinate conversion for polygons have errors, the front-facing shadow polygons RS(T)U, U(T)XY and the back-facing shadow polygons RSVW, WVXY, RWYU have deviation, and a side RS of the front-facing shadow polygon RS(T)U is shifted from a line RS of the back-facing shadow polygon RSVW to a left back side when seen from a visual point as shown in FIG. 14. In that case, a lateral portion R'S'SR of the front-facing shadow polygon R'S'T'U' is positioned outside of the back-facing shadow polygon RSVW. As a result, front surface data "1" written in a region R'S'SR in the stencil buffer remains without being erased by back surface data "−1", which places a shadow on the region R'S'SR on the lateral side of the front-facing shadow polygon R'S'T'U, which is not intended to be shadowed.

SUMMARY OF THE INVENTION

Accordingly, an object of the present invention is to provide a graphic processing apparatus, a graphic processing method, a graphic processing program and a program storage medium, which allow appropriate shadowing even if calculation values of coordinate conversion for polygons have errors.

In order to achieve the object, the present invention provides a graphic processing apparatus having a Z-buffer memory storing a Z value representing a depth of a display object when seen from a visual point per pixel and a pixel memory storing color data on each pixel for creating an image of a shadowed three-dimensional object having a shadow produced by obstructing a ray of light from a light source by the three-dimensional object, comprising:

a visual-point coordinate conversion processing section for upon input of graphic data on normal polygons constituting each object including the three-dimensional object and on shadow polygons constituting a shadow volume that defines a shadow space produced by obstructing the lay of light from the light source by the three-dimensional object, converting the graphic data to visual-point coordinates and depth values, and outputting the obtained visual-point coordinates and depth values in a state of being sorted into those of front-facing shadow polygons that face front, those of back-facing shadow polygons that face back when seen from the visual point, and those of the normal polygons; and a hidden surface removal and shadowing processing section for obtaining a coordinate region that is positioned behind the front-facing shadow polygons and in front of the back-facing shadow polygons when seen from the visual point based on the visual-point coordinates, the depth values and the Z-buffer memory after hidden surface removal processing by Z-buffer method is performed on the normal polygons, and updating color data on pixels in the pixel memory corresponding to the obtained coordinate region to shadow color data.

According to the above constitution, shadowing processing is performed on normal polygons constituting all the objects that are subject to display. Therefore, it becomes possible to place shadows of other three-dimensional objects on the planar polygons such as grounds that are front polygons when seen from the viewpoint of a light source. In such case, shadow polygons constituting a shadow volume is sorted into the front-facing shadow polygons that face front and the back-facing shadow polygons that face back when seen from the visual point, and a coordinate region that is positioned behind the front-facing shadow polygons and in front of the back-facing shadow polygons when seen from the visual point is shadowed. Therefore, if conversion calculation values provided by the visual-point coordinate conversion processing section have errors, an edge portion of the shadow polygons which is originally not intended to be shadowed is not shadowed.

This makes it possible to simplify the constitution of the visual-point coordinate conversion processing section, allowing reduction in size, power consumption and price.

Further, in one embodiment, the Z-buffer memory and the pixel memory have a capacity for one line in one display screen, and the visual-point coordinate conversion processing section and the hidden surface removal and shadowing processing section process per line.

According to this embodiment, the Z-buffer memory and the pixel memory, which are erased every time processings by the visual-point coordinate conversion processing section and the hidden surface removal and shadowing processing section are completed, store Z values and color data for one line. Therefore, the capacity of the Z-buffer memory and the pixel memory is decreased, which allows further reduction in size, power consumption and price.

Further, in one embodiment, if a plurality of the shadow volumes are present, the hidden surface removal and shadowing processing section performs processing concerning the shadow polygons per shadow volume.

According to this embodiment, even in the case where a plurality of three-dimensional objects that cast shadows are present and a plurality of the shadow volumes are set, shadows are appropriately placed on the objects that are subject to display.

Further, according to another aspect of the present invention, there is provided a graphic processing apparatus having a Z-buffer memory storing a Z value representing a depth of a display object when seen from a visual point per pixel and a pixel memory storing color data on each pixel for creating an image of a shadowed three-dimensional object having shadows produced by obstructing a ray of light from a light source by the three-dimensional object, comprising:

a normal polygon conversion section for upon input of graphic data on normal polygons constituting each object including the three-dimensional object, converting the graphic data to visual-point coordinates and depth values;

a shadow polygon conversion section for upon input of graphic data on shadow polygons constituting a shadow volume that defines a shadow space produced by obstructing the lay of light from the light source by the three-dimensional object, converting the graphic data to visual-point coordinates and depth values, and outputting the visual-point coordinates and the depth values in a state of being sorted into those of front-facing shadow polygons that face front when seen from a visual point and those of back-facing shadow polygons that face back when seen from the visual point;

a normal polygon processing section for performing hidden surface removal processing by Z-buffer method on the normal polygons based on the visual-point coordinates and the depth values of the normal polygons and updating color data and a Z value of each pixel in the pixel memory and the Z-buffer memory based on the processing result;

a back-facing shadow polygon processing section for obtaining a coordinate region positioned in front of the back-facing shadow polygons when seen from the visual point based on the visual-point coordinates and the depth values of the back-facing shadow polygons and on the Z values after the hidden surface removal processing is performed;

a shadow flag memory for storing a flag value representing a visual-point coordinate positioned in front of the back-facing shadow polygons; and a front-facing shadow polygon processing section for obtaining a coordinate region positioned behind the front-facing shadow polygons and in front of the back-facing shadow polygons when seen from the visual point based on the visual-point coordinates and the depth values of the front-facing shadow polygons and on the Z values after the hidden surface removal processing is performed and on the flag value, and for updating color data on pixels in the pixel memory corresponding to the obtained coordinate region to shadow color data.

According to the above constitution, shadowing processing is performed on normal polygons constituting all the objects that are display subjects. Therefore, it becomes possible to place shadows of three-dimensional objects on the planar polygons such as grounds that are front polygons when seen from the viewpoint of a light source. In such case, the shadow polygons constituting a shadow volume are sorted into the front-facing shadow polygons that face front and the back-facing shadow polygons that face back when seen from the visual point, and a coordinate region that is positioned behind the front-facing shadow polygons and in front of the back-facing shadow polygons when seen from the visual point is shadowed. Therefore, if conversion calculation values provided by the normal polygon conversion section and the shadow polygon conversion section have errors, an edge portion of the shadow polygons which is not intended to be shadowed is not shadowed.

As a result, it becomes possible to simplify the constitution of the normal polygon conversion section and the shadow polygon conversion section, allowing reduction in size, power consumption and price.

Further, in one embodiment, the Z-buffer memory, the pixel memory, and the shadow flag memory have a capacity for one line in one display screen, and the normal polygon conversion section, the shadow polygon conversion section, the normal polygon processing section, the back-facing shadow polygon processing section, and the front-facing shadow polygon processing section process per line.

According to this embodiment, the Z-buffer memory, the pixel memory and the shadow flag memory, which are erased every time processings by the normal polygon conversion section, the shadow polygon conversion section, the normal polygon processing section, the back-facing shadow polygon processing section, and the front-facing shadow polygon processing section are completed, store a Z value, color data and a flag value for one line. Therefore, as for the line containing no shadow volume, it is not necessary to erase the shadow flag memory, which makes it possible to curtail the duration of time for the entire shadowing processing. Further, the capacity of the Z-buffer memory, the pixel memory and the shadow flag memory is decreased, which allows further reduction in size, power consumption and price.

Further, in one embodiment, if a plurality of the shadow volumes are present, the back-facing shadow polygon processing section and the front-facing shadow polygon processing section perform processing concerning the shadow polygons per shadow volume.

According to this embodiment, even in the case where a plurality of three-dimensional objects that cast shadows are present and a plurality of the shadow volumes are set, shadows are appropriately placed on the objects that are subject to display.

Further, in one embodiment, the normal polygon conversion section, the shadow polygon conversion section, the normal polygon processing section, the back-facing shadow polygon processing section, and the front-facing shadow polygon processing section are included in a portable device.

According to this embodiment, the simplified constitution enables the portable device such as game machines to perform visually appropriate graphics processing.

Further, in one embodiment, the portable device is connectable to a communication network, and the graphic data is obtained through communications via the communication network.

According to this embodiment, it becomes possible to obtain the graphic data that is subjected to the shadowing processing via the communication network. This enhances convenience of the graphic processing apparatus.

Further, according to another aspect of the present invention, there is provided a graphic processing method using a Z-buffer memory storing a Z value representing a depth of a display object when seen from a visual point per pixel and a pixel memory storing color data on each pixel for creating an image of a shadowed three-dimensional object having shadows produced by obstructing a ray of light from a light source by the three-dimensional object, comprising:

converting graphic data on normal polygons constituting each object including the three-dimensional object to visual-point coordinates and depth values;

converting graphic data on shadow polygons constituting a shadow volume that defines a shadow space produced by obstructing the lay of light from the light source by the three-dimensional object to visual-point coordinates and depth values, and sorting the visual-point coordinates and the depth values into those of front-facing shadow polygons that face front when seen from the visual point and those of back-facing shadow polygons that face back when seen from the visual point;

performing hidden surface removal processing by Z-buffer method on the normal polygons based on the visual-point coordinates and the depth values of the normal polygons and updating color data and a Z value of each pixel in the pixel memory and the Z-buffer memory based on the processing result;

obtaining a coordinate region positioned in front of the back-facing shadow polygons when seen from the visual point based on the visual-point coordinates and the depth values of the back-facing shadow polygons and the Z values after the hidden surface removal processing is performed;

obtaining a coordinate region positioned behind the front-facing shadow polygons when seen from the visual point based on the visual-point coordinates and the depth values of the front-facing shadow polygons and the Z values after the hidden surface removal processing is performed; and updating color data on pixels in the pixel memory corresponding to a coordinate region positioned behind the front-facing shadow polygons and in front of the back-facing shadow polygons when seen from the visual point to shadow color data.

According to the above constitution, shadowing processing is performed on normal polygons constituting all the objects that are display subjects. Therefore, it becomes possible to place shadows of three-dimensional objects on the planar polygons such as grounds that are front polygons when seen from the viewpoint of a light source. In such case, a coordinate region that is positioned behind the front-facing shadow polygons and in front of the back-facing shadow polygons when seen from the visual point is shadowed. Therefore, if conversion calculation values of the graphic data on the normal polygon and the shadow polygon have errors, an edge portion of the shadow polygons which is not intended to be shadowed is not shadowed.

As a result, it becomes possible to simplify the constitution of means for converting the graphic data on the normal polygons and the shadow polygons to visual-point coordinates and depth values, allowing reduction in size, power consumption and price.

Further, a graphic processing program of the present invention causes a computer to function as the normal polygon conversion section, the shadow polygon conversion section, the normal polygon processing section, the back-facing shadow polygon processing section, and the front-facing shadow polygon processing section.

According to the above constitution, shadowing processing is performed on normal polygons constituting all the objects that are display subjects, and shadows of three-dimensional objects are also placed on the planar polygons such as grounds that are front polygons when seen from the viewpoint of a light source. In such case, a coordinate region that is positioned behind the front-facing shadow polygons and in front of the back-facing shadow polygons when seen from the visual point is shadowed, so that if conversion calculation values of the graphic data on the normal polygons and the shadow polygons have errors, an edge portion of the shadow polygons which is not intended to be shadowed is not shadowed.

Further, a program storage medium of the present invention stores a graphic processing program of the present invention.

According to the above constitution, through read and execution by a computer, shadowing processing is performed on normal polygons constituting all the objects that are display subjects, and shadows of three-dimensional objects are also placed on the planar polygons such as grounds that are front when seen from the viewpoint of a light source. In such case, a coordinate region that is positioned behind the front-facing shadow polygons and in front of the back-facing shadow polygons when seen from the visual point is shadowed, so that if conversion calculation values of the graphic data on the normal polygons and the shadow polygons have errors, an edge portion of the shadow polygons which is not intended to be shadowed is not shadowed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
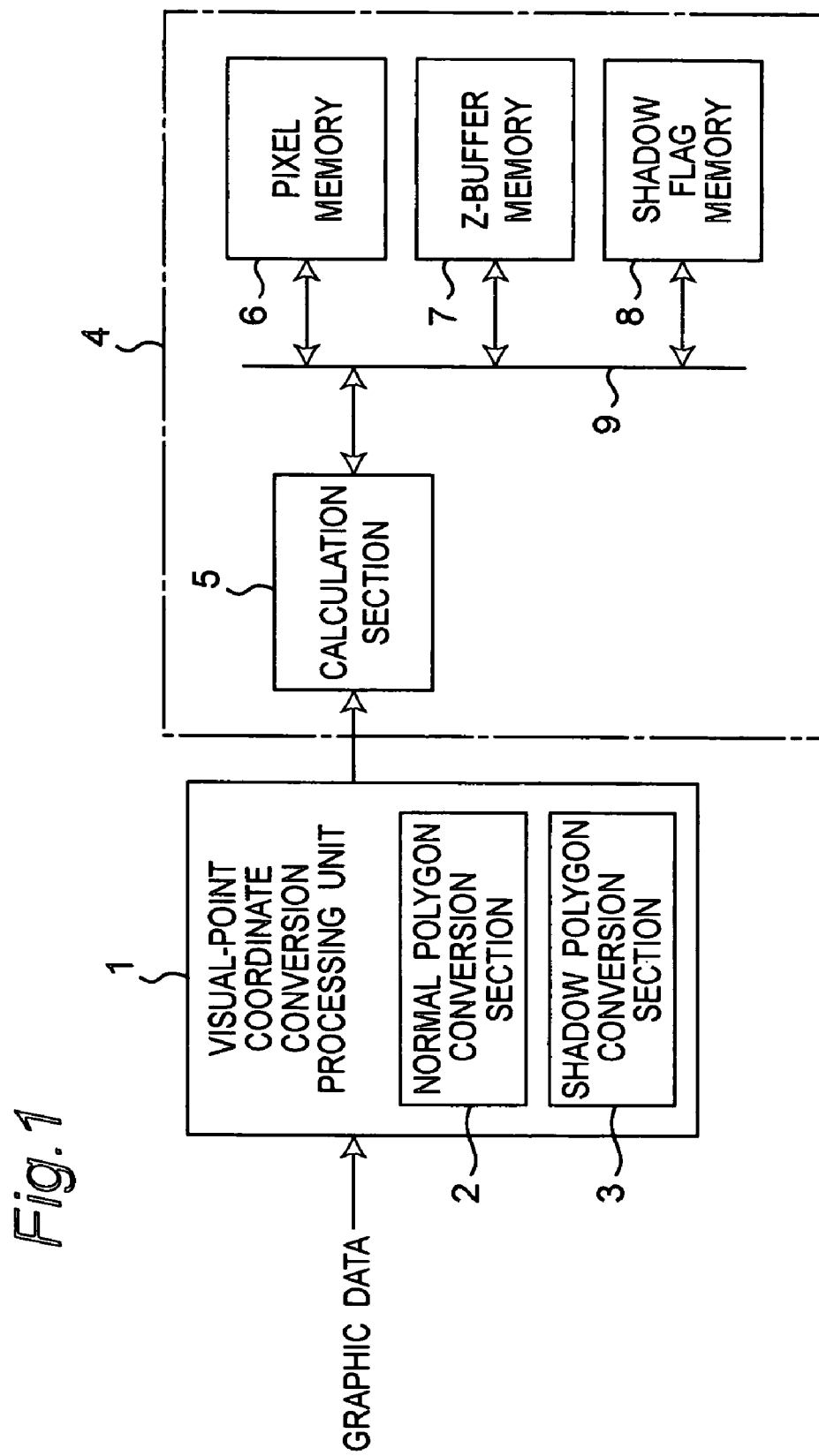
FIG. 1 is a block diagram showing a graphic processing apparatus of the present invention.

The embodiment of the present invention are hereinbelow described in detail with reference to the drawings. FIG. 1 is a block diagram showing a graphic processing apparatus in the present embodiment.

In FIG. 1, the graphic processing apparatus is mainly composed of a visual-point coordinate conversion processing unit 1 and a hidden surface removal and shadowing processing unit 4. The visual-point coordinate conversion processing unit 1, which is so constituted as to include a normal polygon conversion section 2 and a shadow polygon conversion section 3, converts inputted graphic data on normal polygons and shadow polygons to coordinates (visual-point coordinates) and depth values on a display screen, and outputs them to a calculation section 5 in the hidden surface removal and shadowing processing unit 4. Here, the normal polygons are polygons constituting an object, while the shadow polygons are polygons constituting a shadow volume.

In this case, the normal polygon conversion section 2 converts the graphic data on the normal polygons to visual-point coordinates and depth values. The shadow polygon conversion section 3 divides each shadow polygon into back-facing shadow polygons that face back when seen from a visual point and front-facing shadow polygons that face front when seen from the visual point based on the graphic data on the shadow polygons. Further, the graphic data on each shadow polygon is converted to a visual-point coordinate and a depth value. Thus-obtained each visual-point coordinate and depth value are sorted into those of the normal polygons, the back-facing shadow polygons, and the front-facing shadow polygons, and then outputted to the hidden surface removal and shadowing processing unit 4.

In addition to the calculation section 5, the hidden surface removal and shadowing processing unit 4 is also so constituted as to include a pixel memory 6, a Z-buffer memory 7 and a shadow flag memory 8 that are connected to the calculation section 5 via a bus 9. Then, based on the visual-point coordinates and the depth values inputted from the visual-point coordinate conversion processing unit 1, later-described various processings are executed. In this case, the pixel memory 6 stores color data on each pixel. The Z-buffer memory 7 stores a depth value (Z value) of each pixel. The shadow flag memory 8 stores a shadow flag for use in determining whether each pixel is inside or outside the shadow.

Figure 2:
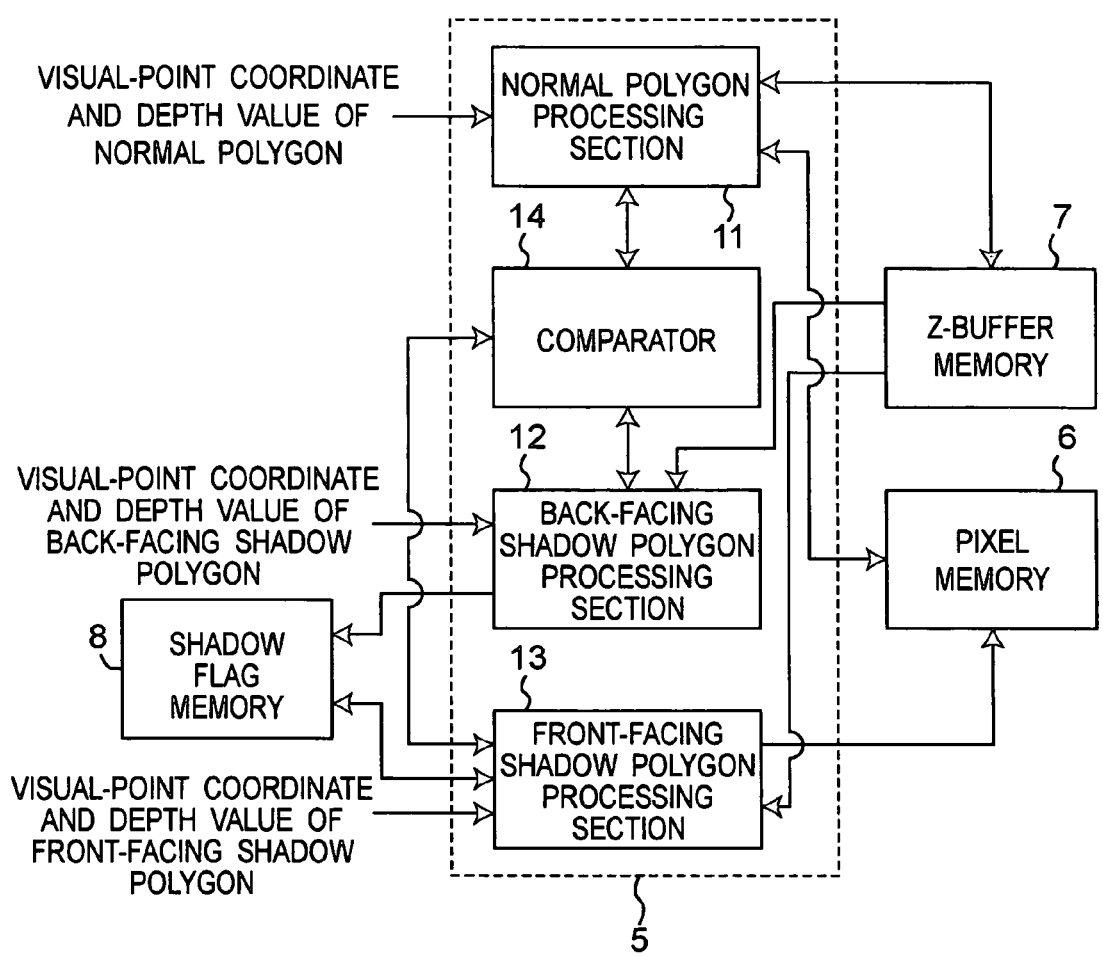
FIG. 2 is a functional block diagram showing a hidden surface removal and shadowing processing unit in FIG. 1.

FIG. 2 is a functional block diagram showing the functional constitution of the hidden surface removal and shadowing processing unit 4. In FIG. 2, the calculation section 5 is so constituted as to include a normal polygon processing section 11, a back-facing shadow polygon processing section 12, a front-facing shadow polygon processing section 13, and a comparator 14. The normal polygon processing section 11 controls the comparator 14 so as to perform hidden surface removal processing by Z-buffer method on the normal polygons based on the inputted visual-point coordinates and depth values of the normal polygons. Then, the pixel memory 6 and the Z-buffer memory 7 are updated. The back-facing shadow polygon processing section 12 controls the comparator 14 so as to perform processing on the back-facing shadow polygons based on the inputted visual-point coordinates and depth values of the back-facing shadow polygons. Then, the shadow flag memory 8 is updated. The front-facing shadow polygon processing section 13 controls the comparator 14 so as to perform processing on the front-facing shadow polygons based on the inputted visual-point coordinates and depth values of the front-facing shadow polygons. Then, the shadow flag memory 8 and the pixel memory 6 are updated. Also, the comparator 14 compares an inputted depth value of each polygon and a depth value stored in the Z-buffer memory 7, and sends back a comparison result to senders.

Thus, during the shadowing processing, an inputted depth value of the shadow polygon and a depth value stored in the Z-buffer memory 7 are compared, and while the shadow flag memory 8 is updated or referred, color data on pixels stored in the pixel memory 6 is corrected based on the comparison result and on the value of the shadow flag memory 8.

Here, a specific hardware configuration of the graphic processing apparatus having the above-stated functional constitution is composed of a program memory that stores various programs including programs that execute later-described various processings, a data memory for storing various data, an external auxiliary memory unit to access to an external storage medium being set thereon, and a CPU (Central Processing Unit) for controlling the program memory, the data memory, the external auxiliary memory unit and the like for executing the hidden surface removal processing, the shadowing processing and the like.

More specifically, the normal polygon conversion section 2, the shadow polygon conversion section 3, the normal polygon processing section 11, the back-facing shadow polygon processing section 12, the front-facing shadow polygon processing section 13 and the comparator 14 are composed of the CPU, while the pixel memory 6, the Z-buffer memory 7 and the shadow flag memory 8 are composed of the data memory or the external auxiliary memory units. Further, in addition to the processing operations according to the present embodiment executed by the aforementioned sections 2, 3, 11 to 14, the CPU also executes various processing operations such as a calculation and determination processing and a data input/output processing.

It is to be noted that the normal polygon conversion section 2 and the shadow polygon conversion section 3 may be composed of a host computer, a graphic processor and the like, which makes it possible to constitute the visual-point coordinate conversion processing unit 1 separately from the hidden surface removal and shadowing processing unit 4 as seen in the present embodiment. In such case, it is also possible to constitute the hidden surface removal and shadowing processing unit 4 so as to be portable by mounting it on a portable device. Further, it is also possible to mount the visual-point coordinate conversion processing unit 1 on a server on a communication network such as internets so as to allow the hidden surface removal and shadowing processing unit 4 to obtain the visual-point coordinate and the depth value through communications.

Further, it is quite possible to configure the entire graphic processing apparatus from hardware by constituting the normal polygon conversion section 2, the shadow polygon conversion section 3, the calculation section 5 and the like in FIG. 1 from a hardware logic having a state machine and a controller for controlling the state or the like.

Figure 3:
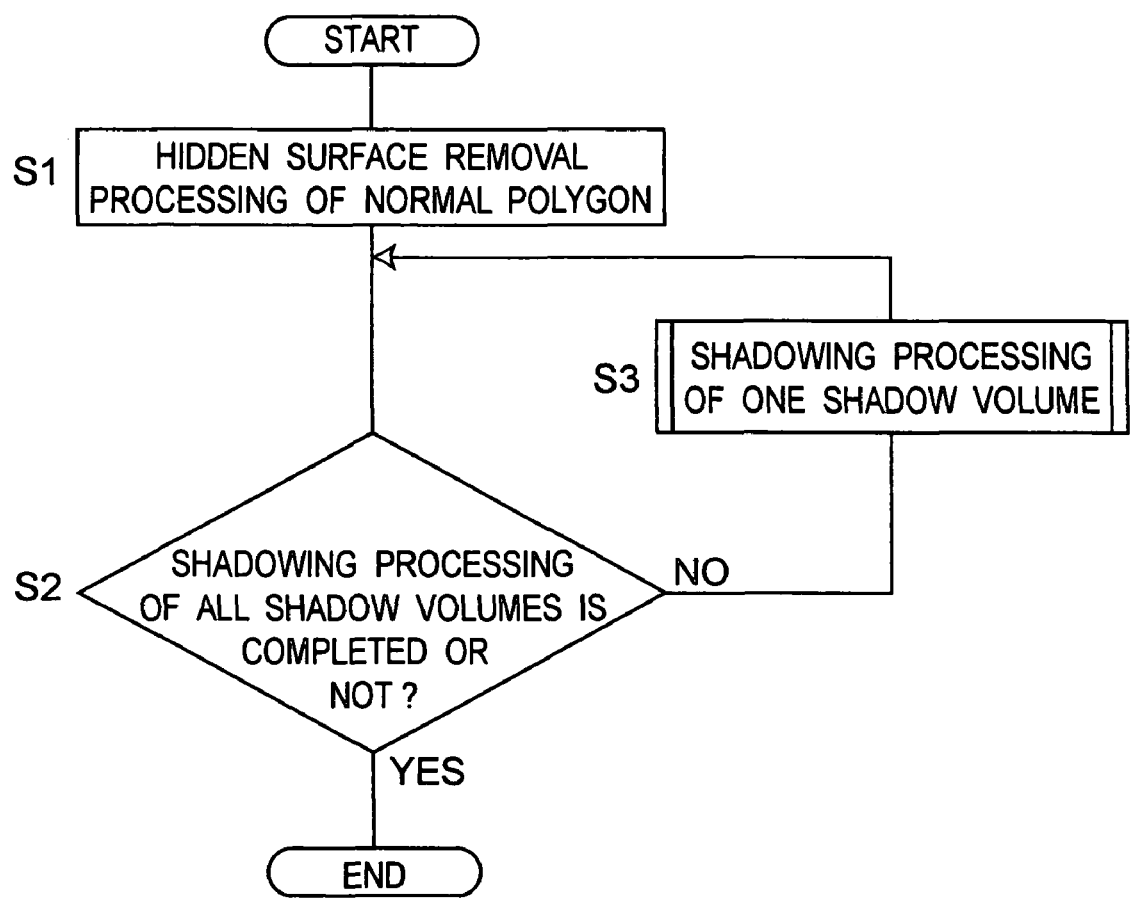
FIG. 3 is a flowchart showing a shadowing processing operation performed by the hidden surface removal and shadowing processing unit in FIG. 1.
Figure 7:
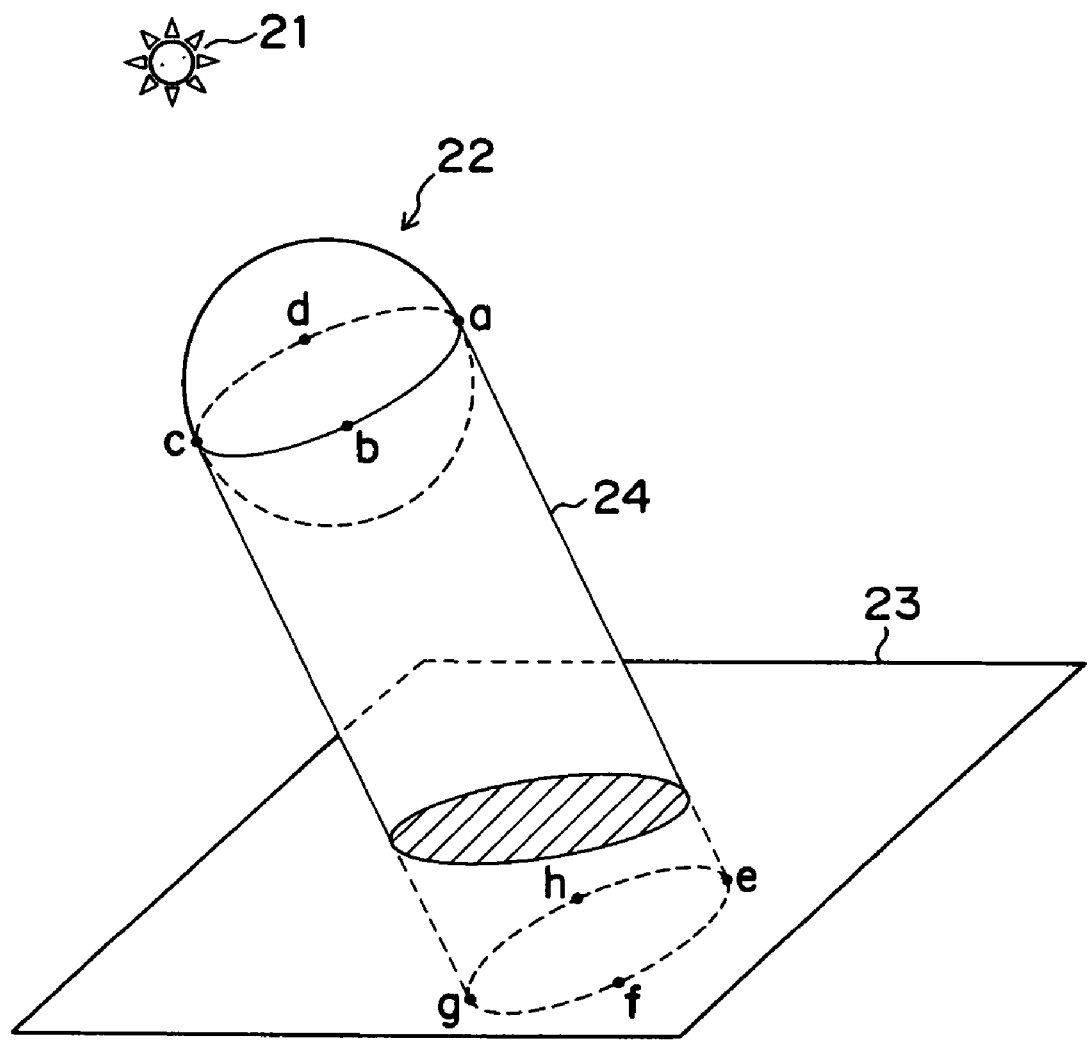
FIG. 7 is an explanatory view showing a relation among a light source, a three-dimensional object and a shadow volume.

FIG. 3 is a flowchart showing an outline of the hidden surface removal and shadowing processing operation executed by the hidden surface removal and shadowing processing unit 4. FIG. 7 shows the relation between a light source 21, a three-dimensional object 22, and a shadow volume 24 that defines a shadow space produced by obstructing a ray of light from a light source 21 by the three-dimensional object 22. As shown in FIG. 7, the shadow volume 24 is formed from a set of extensions of line segments connecting all the dots constituting the three-dimensional object (globe) 22 that casts a shadow and the light source 21. In this embodiment, a region subjected to the shadowing processing is a columnar shadow volume (a cylinder expressed as a polygon in FIG. 7), and a region in which an object with a shadow cast thereon (a plane expressed as a polygon in FIG. 7) intersects with the shadow volume, is obtained as a "shadow".

More specifically, as described earlier, the shadow polygons constituting the shadow volume 24 are divided into a back-facing shadow polygon "adcghe" that faces back when seen from a visual point in a visual-point coordinate system and a front-facing shadow polygon "abcgfe" that faces front and processed accordingly. Hereinbelow, the processing is described in order.

In FIG. 3, in step S1, the normal polygon processing section 11 performs the hidden surface removal processing on normal polygons 22, 23. More specifically, based on the visual-point coordinates and the depth values of normal polygons from the visual-point coordinate conversion processing unit 1, the hidden surface removal processing is performed by Z-buffer method as with the case of the first prior art, and the Z-buffer memory 7 and the pixel memory 6 are updated. As a result, as shown in FIG. 7, the background behind the objects 22, 23 is replaced by the three-dimensional objects 22, 23. It is to be noted that the three-dimensional object 23 is a ground or the like on which the shadow of the three-dimensional object 22 is cast by the light source 21.

In step S2, it is determined whether or not the shadowing processing of all the shadow volumes is completed. If it is not completed, then the procedure proceeds to step S3, whereas if it is completed, the hidden surface removal and shadowing processing operation is terminated. In the step S3, the back-facing shadow polygon processing section 12, the front-facing shadow polygon processing section 13 and the comparator 14 perform the shadowing processing of one shadow volume based on the visual-point coordinates and the depth values of shadow polygons from the visual-point coordinate conversion processing unit 1. It is to be noted that the shadowing processing will be described later in detail. After that, the procedure returns to the step S2, and when the shadowing processing of all the shadow volumes is determined to be completed, the hidden surface removal and shadowing processing operation is terminated.

Figure 4:
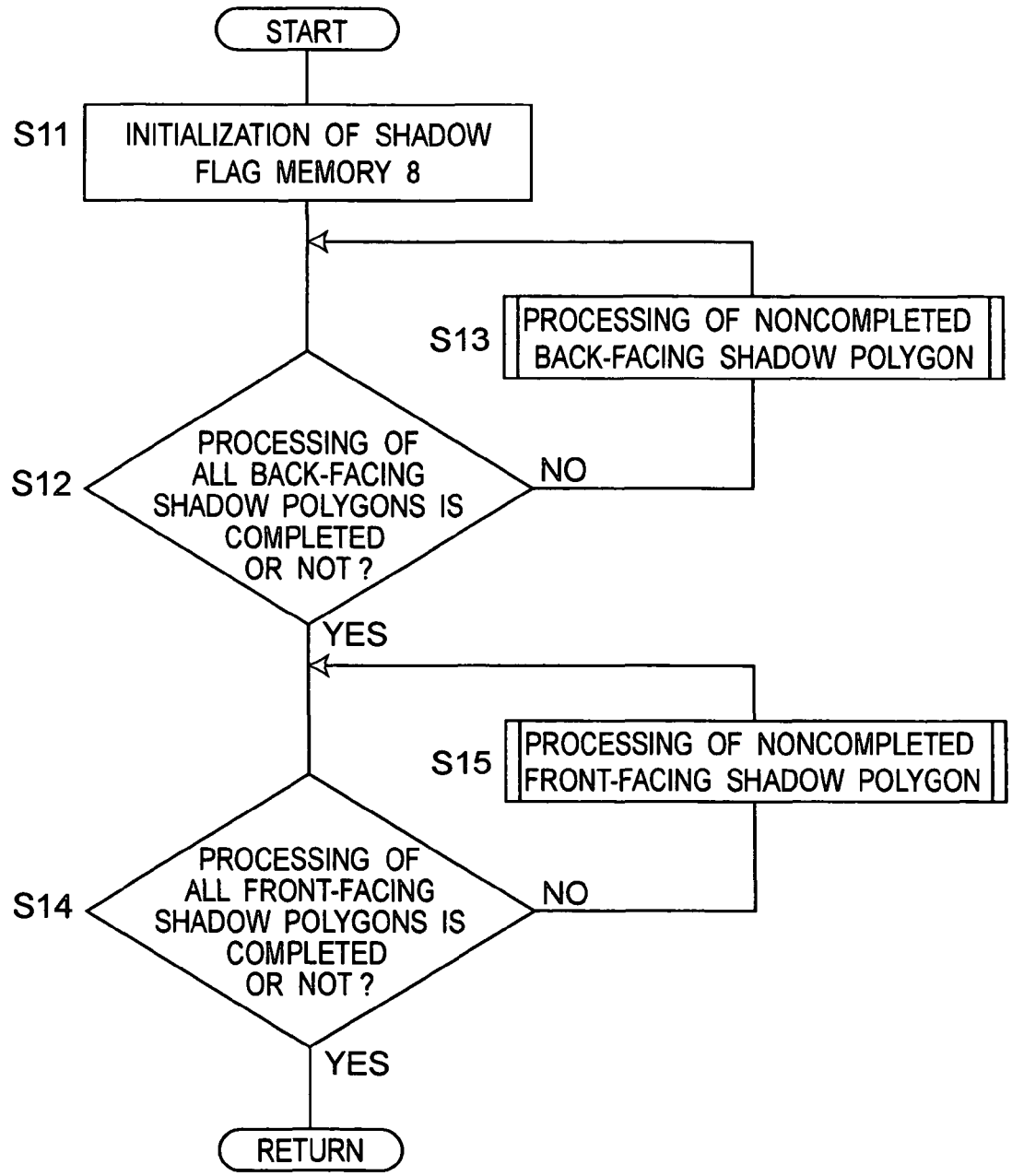
FIG. 4 is a flowchart showing a shadow volume processing operation in the shadowing processing operation shown in FIG. 3.

FIG. 4 is a flowchart showing the shadowing processing operation executed in the step S3 in the hidden surface removal and shadowing processing operation shown in FIG. 3. The shadowing processing operation of one shadow volume 24 is briefly described below with reference to FIG. 4.

In step S11, the shadow flag memory 8 is initialized. It is to be noted that the initialization of the shadow flag memory 8 is carried out by writing a numeral "0" in all the regions corresponding to respective shadow polygons in the shadow flag memory 8. In step S12, it is determined whether or not the processing of all the back-facing shadow polygons is completed. As a result, if it is completed, then the procedure proceeds to step S14, whereas if it is not completed, the procedure proceeds to step S13. In the step S13, the back-facing shadow polygon processing section 12 performs the processing on noncompleted back-facing shadow polygons. It is to be noted that the processing of the back-facing shadow polygons is described later in detail. After that, the procedure returns to the step S12. Then, if the processing of all the back-facing shadow polygons is determined to be completed in the step S12, the procedure proceeds to step S14.

In the step S14, it is determined whether or not the processing of all the front-facing shadow polygons is completed. As a result, if it is completed, then the shadowing processing operation is terminated, and the procedure returns to the step S2 in the hidden surface removal and shadowing processing operation shown in FIG. 3. If it is not completed, then the procedure proceeds to step S15. In the step S15, the front-facing shadow polygon processing section 13 performs the processing of noncompleted front-facing shadow polygons, and then the procedure returns to the step S14. It is to be noted that the processing of the front-facing shadow polygons is described later in detail. If the processing of all the front-facing shadow polygons is determined to be completed in the step S14, then the shadowing processing operation is terminated, and the procedure returns to the hidden surface removal and shadowing processing operation.

Figure 5:
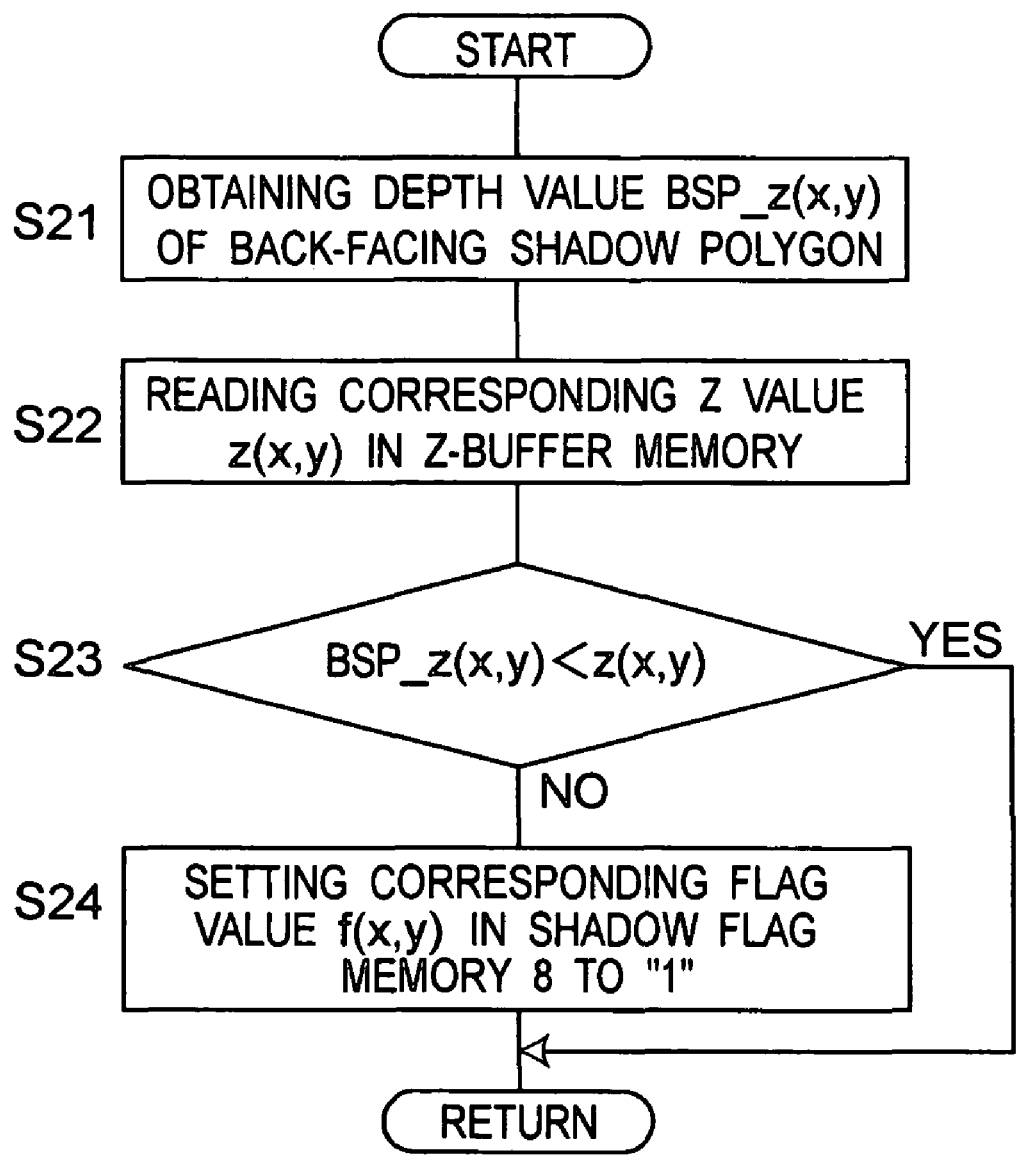
FIG. 5 is a flowchart showing a back-facing shadow polygon processing operation in the shadow volume processing operation shown in FIG. 4.

FIG. 5 is a flowchart showing the processing operation of the back-facing shadow polygons executed by the back-facing shadow polygon processing section 12 and the comparator 14 in the step S13 in the shadowing processing operation shown in FIG. 4. Following description explains the processing operation of the back-facing shadow polygons with reference to FIG. 5. If the processing of anyone of all the back-facing shadow polygons is determined to be noncompleted in the step S12 in the shadowing processing operation shown in FIG. 4, then the back-facing shadow polygon processing operation is started.

In step S21, with respect to the region of one back-facing shadow polygon selected among from the unprocessed back-facing shadow polygons, a depth value $BSP\_z(x, y)$ of a coordinate $(x, y)$ of the pixel thereof is obtained. Generally, the depth values of a polygon can be obtained by interpolating a coordinate between vertexes and an internal coordinate based on visual-point coordinates of vertexes inputted from the visual-point coordinate conversion processing unit 1. In step S22, a Z value $z(x, y)$ of the same coordinate $(x, y)$ in the Z-buffer memory 7 is read out.

In step S23, the comparator 14 compares the depth value $BSP\_z(x, y)$ obtained in the step S21 and the Z value $z(x, y)$ read out in the step S22 (depth dest). Then, it is determined whether or not the depth value $BSP\_z(x, y)$ is smaller than the Z value $z(x, y)$. As a result, if the depth value $BSP\_z(x, y)$ is smaller than the Z value, then the back-facing shadow polygon processing operation is terminated without execution of any processing, and the procedure returns to the step S12 in the shadowing processing operation shown in FIG. 4. If it is equal to or larger than the Z value, then the procedure proceeds to the step S24.

In the step S24, a numeral "1" is written in the coordinate $(x, y)$ in the shadow flag memory 8 as a flag value $f(x, y)$. After that, the back-facing shadow polygon processing operation is terminated, and the procedure returns to the shadowing processing operation.

It is to be noted that though not described in detail in the flowchart shown in FIG. 5, the processings of the steps S21 to S24 are repeatedly performed on all the pixels (all x, y) in the back-facing shadow polygons that are subject to the processings.

Normally, in the Z-buffer method, if a depth test result is "true" (the depth value of a polygon is smaller than the Z value in the Z-buffer memory 7), the processing is carried out. Contrary to this, regarding the back-facing shadow polygons in this processing, if a depth test result is "false" (the depth value of a back-facing shadow polygon is equal to or above the Z value in the Z-buffer memory 7), a processing of writing a numeral "1" as a corresponding flag value $f(x, y)$ in the shadow flag memory 8 is carried out. As an example, expressed with dashed lines in FIG. 8 are regions where a numeral "1" is set in the shadow flag memory 8 in the step S24 in the back-facing shadow polygon processing operation when the visual-point coordinates and the depth values of a globe-shaped normal polygon 22, a planar normal polygon 23 and a cylindrical shadow volume 24 are inputted with the positional relationship shown in FIG. 7.

Figure 8:
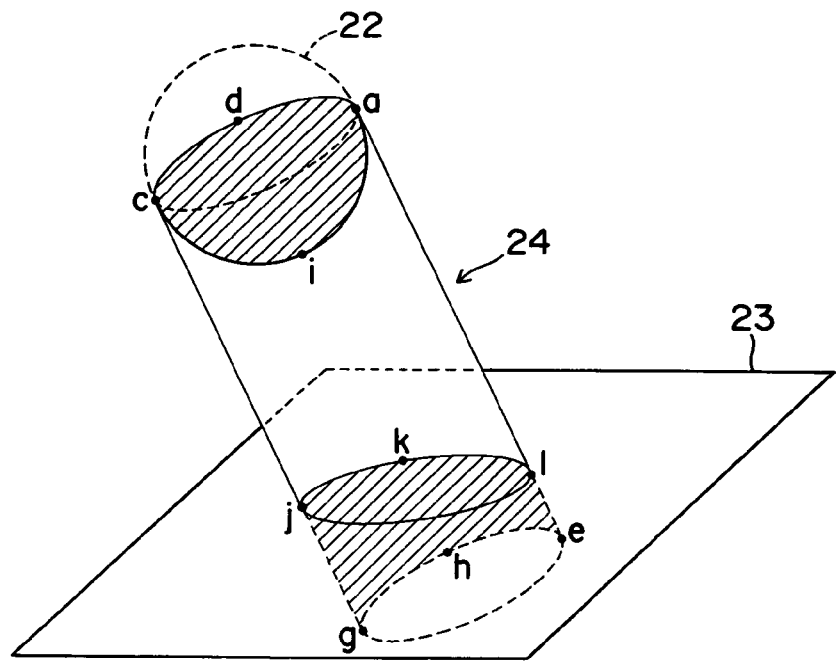
FIG. 8 is a view showing a region where a numeral "1" is set in a shadow flag memory in FIG. 7.

In FIG. 8, in a region "adci" behind the globe 22, i.e., a normal polygon when seen from a visual point and a region "ghelkj" behind the planar 23, i.e., a normal polygon when seen from the visual point, among coordinate regions of the back-facing shadow polygon "adcghe", a numeral "1" is set.

Figure 6:
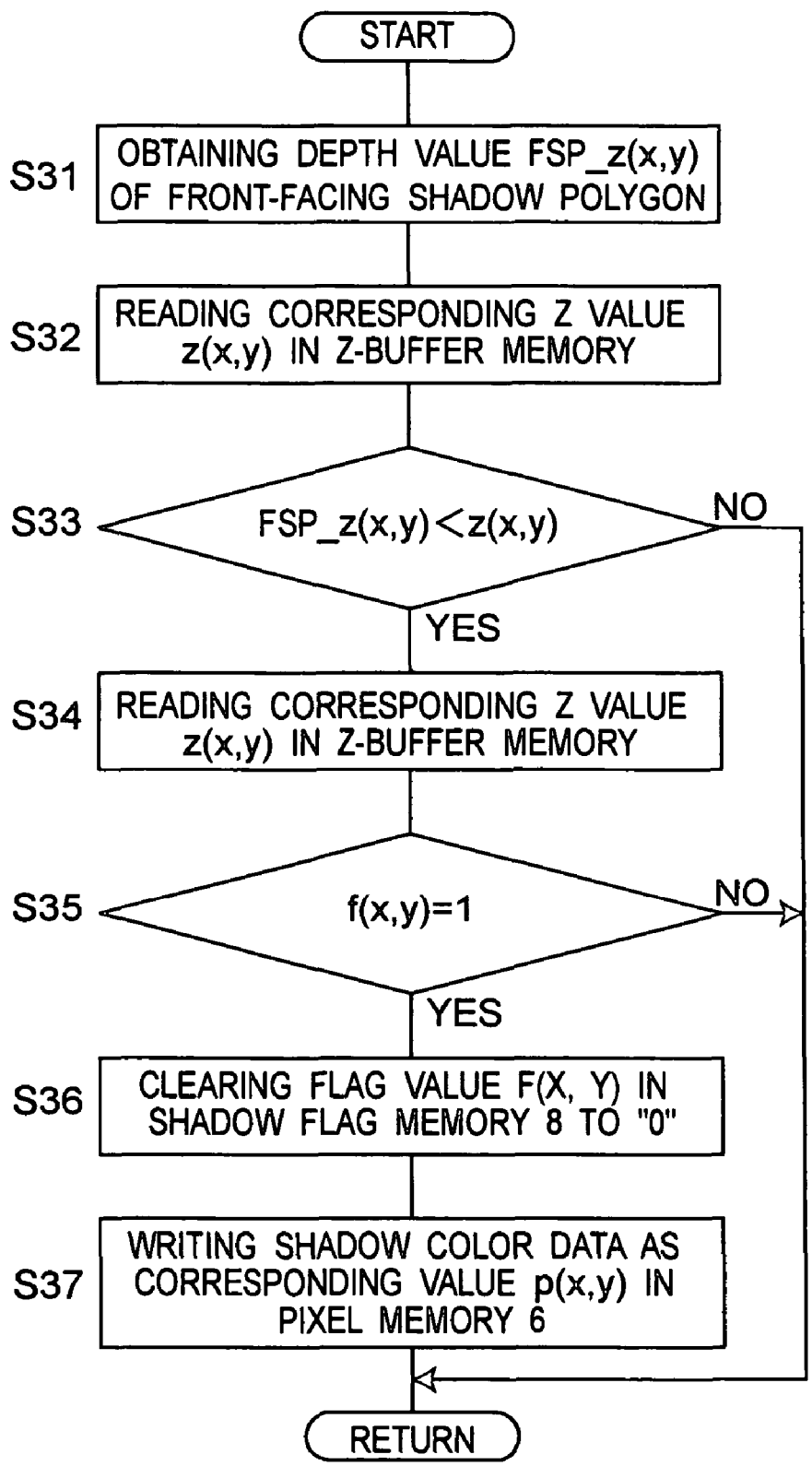
FIG. 6 is a flowchart showing a front-facing shadow polygon processing operation in the shadow volume processing operation shown in FIG. 4.

FIG. 6 is a flowchart showing the processing operation of front-facing shadow polygons executed by the front-facing shadow polygon processing section 13 and the comparator 14 in the step S15 in the shadowing processing operation shown in FIG. 4. Following description explains the processing operation of the front-facing shadow polygons with reference to FIG. 6. In the step S14 in the shadowing processing operation shown in FIG. 4, if it is determined that the operation of anyone of all the front-facing shadow polygons is not completed, then the front-facing shadow polygon processing operation is started.

In step S31, regarding the region of one front-facing shadow polygon selected among from the unprocessed front-facing shadow polygons, a depth value FSP_z (x, y) of a coordinate (x, y) of the pixel thereof is obtained by interpolating a coordinate between vertexes and an internal coordinate as with the case of the above-described back-facing shadow polygon. In step S32, a Z value z (x, y) of the same coordinate (x, y) in the Z-buffer memory 7 is read out. In step S33, the comparator 14 determines whether or not the depth value FSP_z (x, y) obtained in the step S31 is smaller than the Z value z (x, y) read out in the step S32. As a result, if the depth value FSP_z (x, y) is smaller than the Z value, then the procedure proceeds to step S34, whereas if it is equal to or larger than the Z value, then the front-facing shadow polygon processing operation is terminated without execution of any processing, and the procedure returns to the step S14 in the shadowing processing operation.

In the S34, a flag value f (x, y) corresponding to the coordinate (x, y) in the shadow flag memory 8 is read out. In step S35, it is determined whether or not the read flag value f (x, y) is "1". As a result, if it is "1", then the procedure proceeds to step S36, whereas if it is not "1", the front-facing shadow polygon processing operation is terminated without execution of any processing, and the procedure returns to the step S14 in the shadowing processing operation. Thus, unlike the processings of the aforementioned back-facing shadow polygons, if the depth test result is "true" (the depth value of a front-facing shadow polygon is smaller than the Z value in the Z-buffer memory 7), the next processing is carried out, whereas if the depth test result is "false", then the front-facing shadow polygon processing operation is terminated without further processing.

Figure 9:
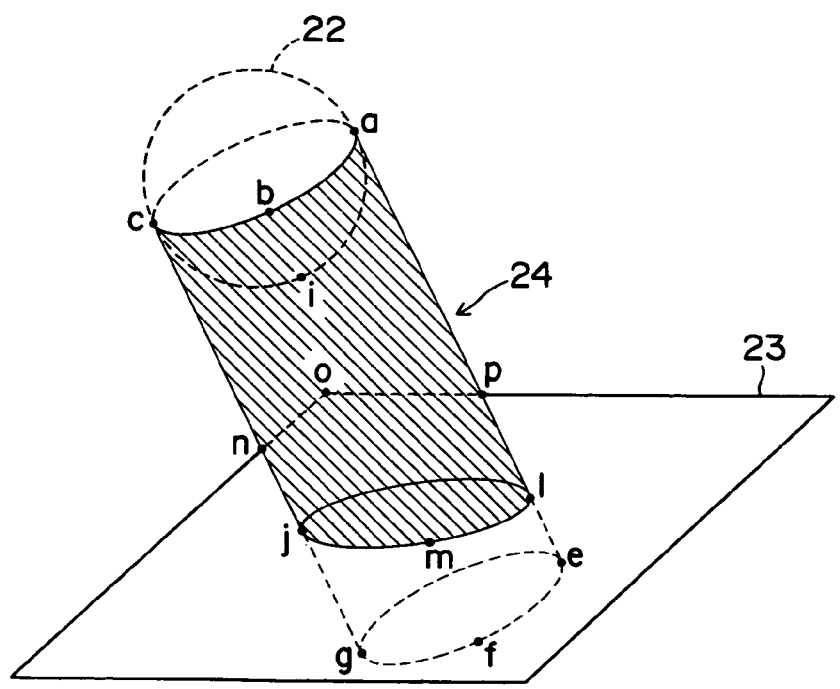
FIG. 9 is a view showing a region where the result of a depth test of front-facing shadow polygons is "true" in FIG. 7.

As an example, regions in which the depth test result of the front-facing shadow polygon is "true" are expressed with a dashed line in FIG. 9. In FIG. 9, among coordinate regions of a front-facing shadow polygon "abcgfe", a region "abci" in front of a planar normal polygon 23, i.e., a normal polygon when seen from a visual point, a region "jnoplm" in front of a plane 23, i.e., a normal polygon when seen from the visual point, a region "nciapo" in front of a background when seen from the visual point are determined to be "true" in the depth test, and subjected to the next processing.

In step S36, a flag value f (x, y) of the same coordinate (x, y) in the shadow flag memory 8 is cleared to "0". In step S37, shadow color data is written as a value p (x, y) of the same coordinate (x, y) in the pixel memory 6. After that, the front-facing shadow polygon processing operation is terminated and the procedure returns to the shadowing processing operation.

It is to be noted that though not described in detail in the flowchart shown in FIG. 6, the processings of the steps S31 to S37 are repeatedly performed on all the pixels (all x, y) in the front-facing shadow polygons that are subject to the processings.

Here, the flag value of the shadow flag memory 8 read out in the step S34 is "1" only in the coordinates in each shadow volume where the depth test result of the back-facing shadow polygon is "false". Further, shadow color data is written onto the pixel memory 6 in the step S37 only in the coordinates where the depth test result is "true" in the step S33. That is to say, shadowing is performed on pixels within a region positioned in front of the back-facing shadow polygons (the shadow polygon "adcghe" in FIG. 7) and behind the front-facing shadow polygons (the shadow polygon "abcgfe" in FIG. 7) with respect to the visual-point coordinate.

Figure 10:
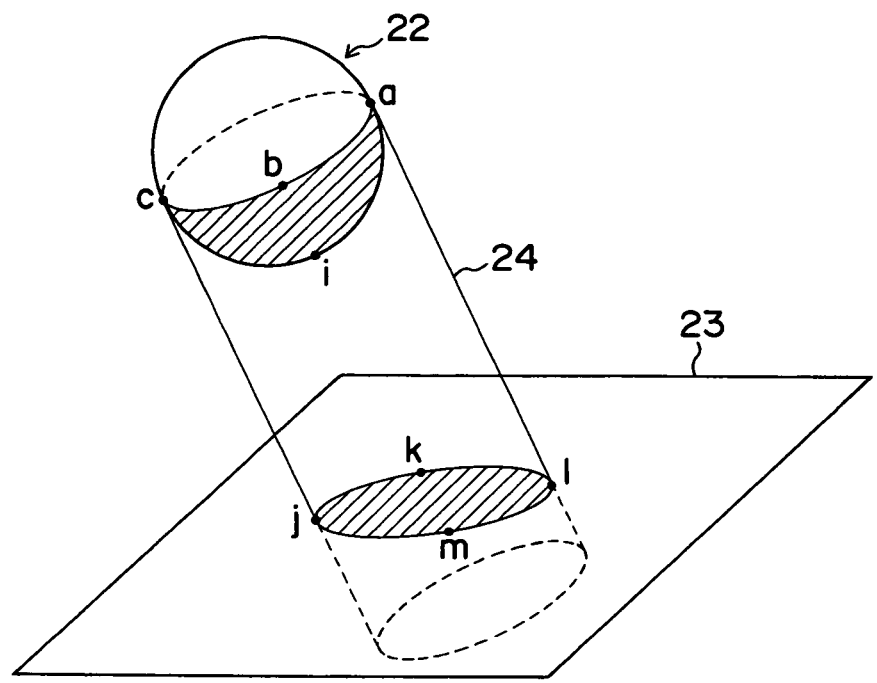
FIG. 10 is a view showing a region which is subjected to the shadowing processing in FIG. 7.

As an example, regions subjected to the shadowing processing in the aforementioned visual-point coordinates are expressed with a dashed line in FIG. 10. In FIGS. 8, 9 and 10, shadowing is performed on regions positioned in front of a back-facing shadow polygon "adcghe" and behind a front-facing shadow polygon "abcgfe" when seen from a visual point, i.e., a region "aicb" and a region "lmjk" that are formed by the dashed regions in FIG. 8 being overlapped with the dashed region in FIG. 9. It is to be noted that the shadowing in this case can be achieved just by modulating the value p (x, y) in the pixel memory 6 with use of the color data on shadow polygons as described before.

As described above, in the present embodiment, all the normal polygons regardless of whether they are front polygons or back polygons when seen from the viewpoint of the light source 21 are subject to the processing. Therefore, like the plane 23 on which a shadow of the three-dimensional object 22 is cast, it becomes possible to place a shadow of the globe 22 on a normal polygon that is a front polygon when seen from the viewpoint of the light source 21.

Further in the present embodiment, shadowing is performed only on a region in front of back-facing shadow polygons and behind front-facing shadow polygons when seen from a visual point. Therefore, if errors are generated when graphic data on polygons is converted by the visual-point coordinate conversion processing unit 1, an edge portion of the shadow polygons which is originally not intended to be shadowed is not shadowed.

Figure 11:
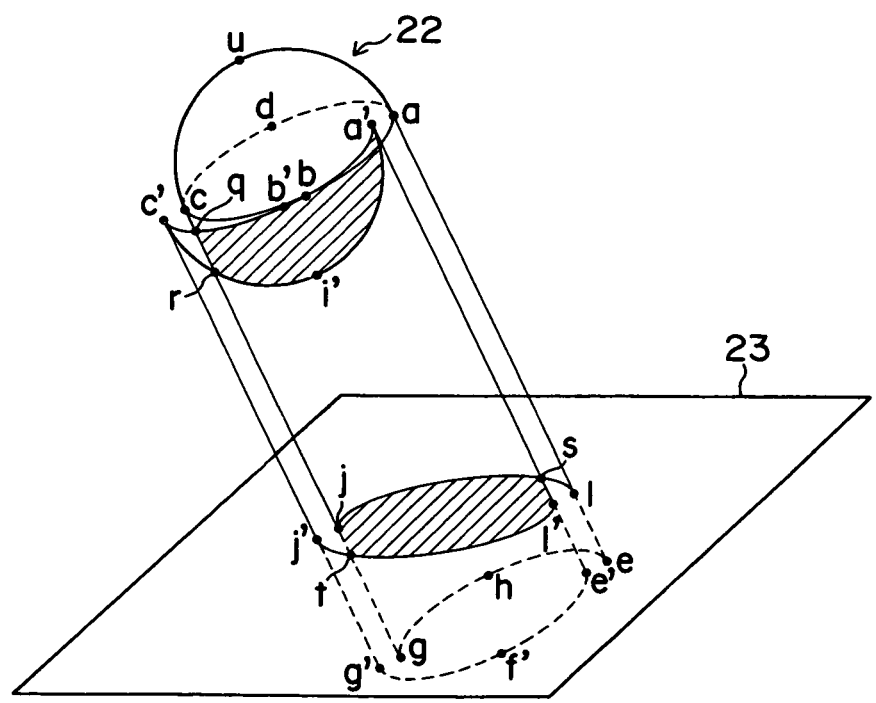
FIG. 11 is an explanatory view showing a result of the shadowing processing in the case where conversion calculation values provided by the visual-point coordinate conversion processing unit in FIG. 1 have errors.
Figure 12:
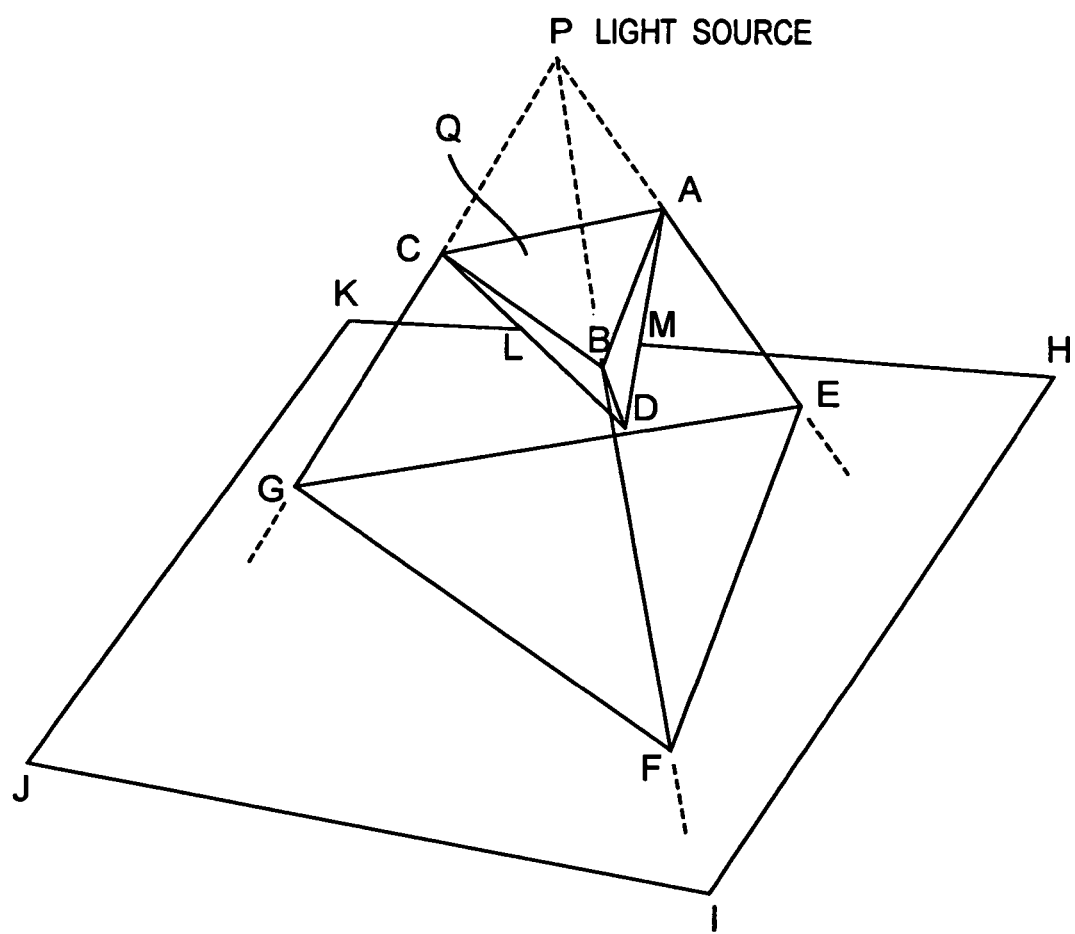
FIG. 12 is an explanatory view showing a conventional shadowing processing of a three-dimensional object.
Figure 13A:
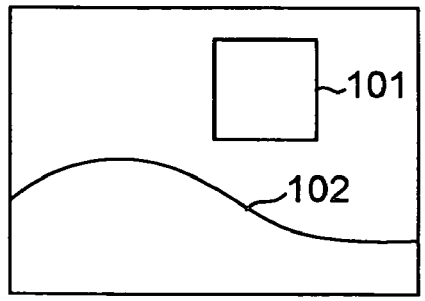
FIGS. 13A to 13G are explanatory views showing a conventional shadowing processing of a three-dimensional object different from that of FIG. 12.
Figure 13B:
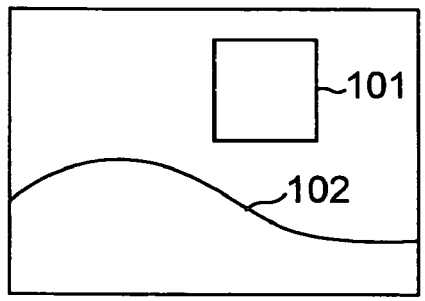
Figure 13C:
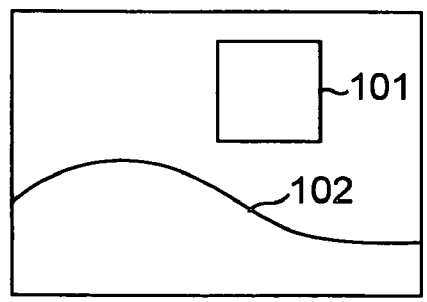
Figure 13D:
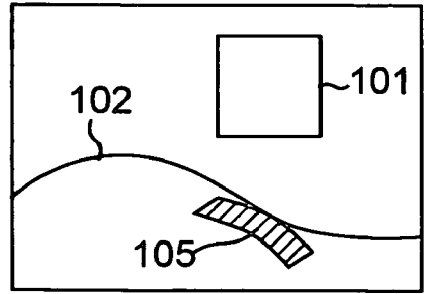
Figure 13E:
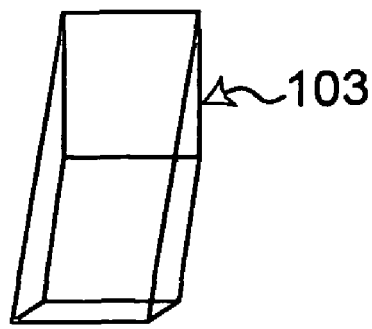
Figure 13F:
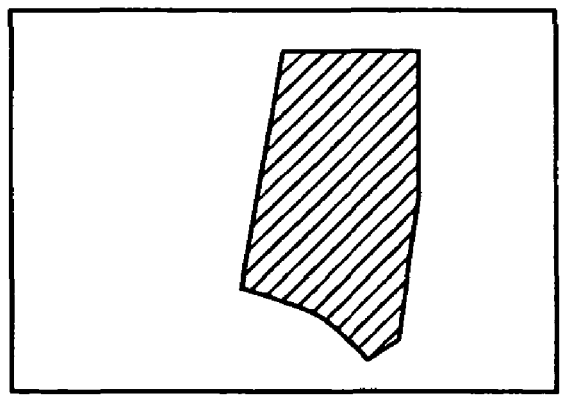
Figure 13G:
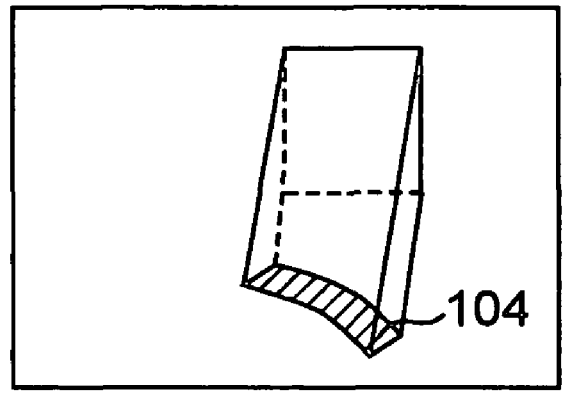
Figure 14:
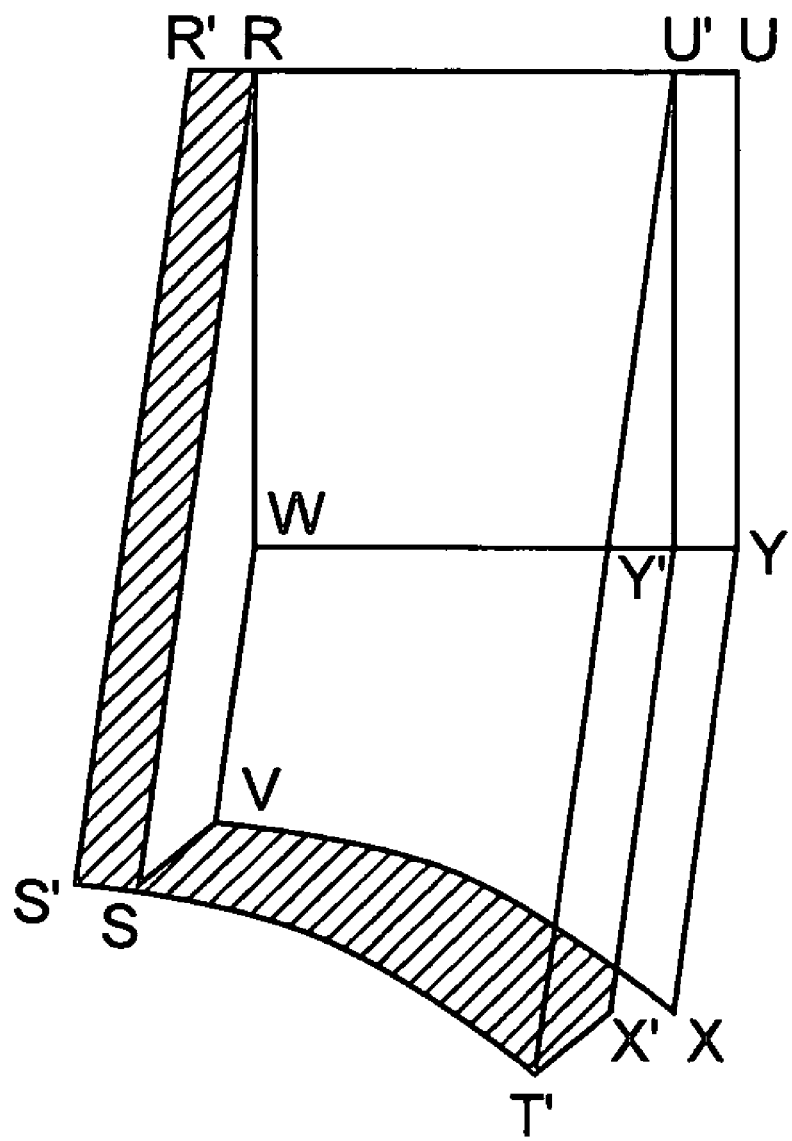
FIG. 14 is an explanatory view showing a result of the shadowing processing in the case where conversion calculation values of a polygon have errors when the conventional shadowing processing shown in FIGS. 13A to 13G is performed.

More specifically, it is assumed that when conversion by the visual-point coordinate conversion processing unit 1 is carried out, a polygon "abci" (see FIG. 9) on the back side of the globe 22 when seen from the viewpoint of the light source 21 and a front-facing shadow polygon "abcgfe" (see FIG. 9) when seen from a visual point are shifted from a polygon "abcu" (see FIG. 11) on the front side of the globe 22 when seen from the viewpoint of the light source 21 and a back-facing shadow polygon "adcghe" when seen from the visual point toward the left-hand side in the figure as shown in FIG. 11. In this case, shadows are placed by the hidden surface removal and shadowing processing unit 4 on a region "a'i'rgb'" and a region "sl'tj" in front of the back-facing shadow polygons and behind the front-facing shadow polygons when seen from the visual point. Therefore, an edge portion "ac'j'tjr" of the shadow polygon is not provided with a shadow.

It is to be noted that if misalignment of polygons as shown in FIG. 11 occurs when the shadowing processing using the function of OpenGL disclosed in the first prior art is carried out with the positional relationship between the globe normal polygon 22, the planar normal polygon 23 and the columnar shadow volume 24 as shown in FIG. 7, a shadow is also placed on a lateral portion "qc'j'tjr" of a front-facing shadow polygon "a'b'c'j'".

If an expensive high-performance computing machine is used, a resolution (bit number) of data becomes large and therefore calculation values of coordinate conversion have smaller errors. Therefore, the conventional shadowing processing by the second prior art is executed without any problem. However, in the field of game machines and the like, downsizing, lower power consumption and simplification (lower price) of the system are required, and particularly, for application of the system to portable devices, simplification of the constitution is a premise. In this case, generation of errors during conversion of graphic data is unavoidable, and in such a condition, graphics processing should still be performed at visually appropriate level. According to the present embodiment, even if errors are generated during conversion of graphic data, visual noise is not generated, which makes it possible to perform visually appropriate graphics processing with a simplified constitution.

Therefore, it becomes possible to constitute the graphic processing apparatus of the present embodiment to be portable for mounting it on a portable device. Further, it is also possible to constitute the graphic processing apparatus so as to obtain graphic data on normal polygons and shadow polygons through communications via the communication network by mounting the graphic processing apparatus on a portable terminal. It is also possible as a matter of course to mount the hidden surface removal and shadowing processing unit 4 on a portable terminal so as to obtain visual-point coordinates and depth values from the visual-point coordinate conversion processing unit 1 via the communication network.

Further, in the present embodiment, the back-facing shadow polygon processing section 12 and the front-facing shadow polygon processing section 13 perform the processing concerning the shadow polygons per shadow volume. Therefore, even in the case where a plurality of three-dimensional objects that cast shadows are present and a plurality of the shadow volumes are set, shadows are appropriately placed on the objects that are subject to display.

In the above description, the pixel memory 6, the Z-buffer memory 7 and the shadow flag memory 8 are not specified in capacity and the like. The sufficient capacity of these memories 6, 7, 8 is a capacity for one display screen in the frame buffer method and a capacity for one line in the line scanning method. Particularly in the case of the line buffer method, a necessary storage capacity is small, and so a processing for initializing the shadow flag memory 8 per shadow volume imposes almost no load.

Further, in the present embodiment, the comparator for use in the depth test of the shadow polygons can be also used as a comparator for normal polygons by modifying the comparator for use in the depth test of the normal polygons.

Further, in the above description, the three-dimensional object (globe) 22 which is a shadow casting object itself is also provided with a shadow on its back side when seen from the viewpoint of the light source 21, so that a start end of the shadow volume 24 is set to be the globe 22. However, the shading of the globe 22 which is a shadow casting subject may be performed by a processing other than the processing in the present embodiment, such as shading by diffuse reflection light or specular reflection light, constant shading, glow shading and phone shading. In such cases, by setting the start end of the shadow volume to be not overlapped with the globe 22, a shadow can be placed only on the ground 23 by the shadowing method in the present embodiment.

In the case where the normal polygon conversion section 2, the shadow polygon conversion section 3, the normal polygon processing section 11, the back-facing shadow polygon processing section 12, the front-facing shadow polygon processing section 13 and the comparator 14 in the above-stated embodiment are constituted from the CPUs, their various functions are implemented by a graphic processing program stored in a program storage medium. The program storage medium in above-stated embodiment is a program medium composed of ROM (Read Only Memory). Alternatively, the program storage medium may be a program medium which is mounted on the external auxiliary memory unit and read out therefrom. It is to be noted that in each case, a program read unit for reading a graphic processing program from a program medium may have the constitution for reading the program through direct access to the program medium or the constitution for downloading the program to a program storage area (unshown) provided in RAM (Random Access Memory) and reading it through access to the program storage area. It is to be noted that a download program for downloading the program from the program medium to the RAM program storage area is to be stored in advance in a main unit.

Here, the program medium refers to a medium that is constituted separately from the main unit and that includes: tapes such as magnetic tapes and cassette tapes; disks such as magnetic disks including floppy disks and hard disks and optical disks including CD (Compact Disk)-ROM disks, MO (Magneto-Optical) disks, MDs (Mini Disks) and DVDs (Digital Versatile Disks); cards such as IC (Integrated Circuit) cards and optical cards; and semiconductor memories such as mask ROMs (Read Only Memories), EPROMs (ultraviolet Erasable Programmable ROMs), EEPROMs (Electrically Erasable Programmable ROMs) and flash ROMs for holding a program in a fixed manner.

Further, in the graphic processing apparatus in the above embodiment, if having a constitution allowing connection to the communication network through a communication interface, the program medium may be a medium for holding a program in a flux manner through downloading from a communication network. It is to be noted that in such case, a download program for downloading the program from the communication network is set to be stored in advance in a main unit. Alternatively, the program is set to be installed from other storage media.

It is to be understood that without being limited to the program, the storage medium may store data.

As is clear from the above description, according to this invention, graphic data on normal polygons constituting each object and a shadow polygon constituting a shadow volume is converted to visual-point coordinates and depth values, the polygons are sorted into front-facing shadow polygons that face front, back-facing shadow polygons that face back when seen from a visual point and the normal polygons, a coordinate region positioned behind the front-facing shadow polygons and in front of the back-facing shadow polygons when seen from the visual point is obtained after hidden surface removal processing by Z-buffer method is performed on the normal polygons, and color data on pixels in the pixel memory corresponding to the obtained coordinate region is updated to shadow color data, so that shadowing processing can be performed on the normal polygons that constitute all the objects that are display subjects. Therefore, shadows of other three-dimensional objects may be placed on a planar polygon such as grounds that are front polygons when seen from the viewpoint of a light source.

Further, a shadow is also placed on a coordinate region positioned behind the front-facing shadow polygons and in front of the back-facing shadow polygons when seen from the visual point. Therefore, even if conversion calculation values provided by conversion processing of the graphic data have errors, an edge portion of the shadow polygons which is not intended to be shadowed is not shadowed. This makes it possible to simplify the graphic data conversion processing unit, allowing reduction in size, power consumption and price.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A graphic processing apparatus having a Z-buffer memory storing a Z value representing a depth of a display object when seen from a visual point per pixel and a pixel memory storing color data on each pixel for creating an image of a shadowed three-dimensional object having a shadow produced by obstructing a ray of light from a light source by the three dimensional object, comprising:

a visual-point coordinate conversion processing section for upon input of graphic data on normal polygons constituting each object including the three-dimensional object and on shadow polygons constituting a shadow volume that defines a shadow space produced by obstructing the ray of light from the light source by the three-dimensional object, converting the graphic data to visual-point coordinates consisting x-coordinates and y-coordinates and depth values, and outputting the obtained visual-point coordinates and depth values in a state of being sorted into those of front-facing shadow polygons that face front, those of back-facing shadow polygons that face back when seen from the visual point, and those of the normal polygons; and a hidden surface removal and shadowing processing section for obtaining a coordinate region that is positioned behind the front-facing shadow polygons and in front of the back-facing shadow polygons when seen from the visual point based on the visual-point coordinates, obtaining Z-buffer memory Z values after hidden surface removal processing by Z-buffer method performed on the normal polygons to remove hidden surfaces of the normal polygons, wherein the Z-buffer memory Z values are depth values of un-hidden surfaces of the normal polygons that have been converted into the visual-point coordinates, and updating color data on selected pixels in the pixel memory corresponding to the obtained coordinate region and the un-hidden surfaces of the normal polygons to shadow color data, wherein the selected pixels correspond to a flagged region of a shadow flag memory, and wherein the shadow flag memory stores a shadow flag for use in determining whether each pixel is inside or outside a shadow, processing of the back-facing shadow polygons includes obtaining the depth value of each pixel of the back-facing shadow polygons, and performing a Z test in which the depth value is compared with a corresponding Z value obtained from the Z-buffer memory, and if the depth value is equal to or greater than the corresponding Z value, then the pixel is processed as belonging to a Z-test failed region of the back-facing shadow polygons, wherein a greater depth value means greater distance from the visual point, wherein a region of the shadow flag memory is flagged with shadow flags to represent the Z-test failed region of the back-facing shadow polygons, and wherein each shadow flag corresponds to a pixel, processing of the front-facing shadow polygons includes obtaining the depth value of each pixel of the front-facing shadow polygons, and performing a Z test in which the depth value is compared with a corresponding Z value obtained from the Z-buffer memory, and if the depth value is smaller than the corresponding Z value, then the pixel is processed as belonging to a Z-test passed region of the front-facing shadow polygons, wherein a smaller depth value means a closer distance to the visual point, and wherein during an iteration of each pixel in the Z-test passed region of the front-facing shadow polygons, an intersection pixel is located after finding a shadow flag in the shadow flag memory for a corresponding iterated pixel in the Z-test passed region of the front-facing shadow polygons, wherein the shadow flag in the shadow flag memory for the corresponding iterated pixel has been set by the processing of the back-facing shadow polygons, wherein the intersection pixel belongs to an intersection of the Z-test failed region of the back-facing shadow polygons and the Z-test passed region of the front-facing shadow polygons, and wherein the intersection pixel is one of the selected pixels, obtaining the intersection of the Z-test failed region of the back-facing shadow polygons and the Z-test passed region of the front-facing shadow polygons, and determining that pixels contained in the intersection are within a shadow to provide the pixels with color representing the shadow.

2. The graphic processing apparatus as defined in claim 1, wherein the Z-buffer memory and the pixel memory have a capacity for one line in one display screen, and the visual-point coordinate conversion processing section and the hidden surface removal and shadowing processing section process per line.

3. The graphic processing apparatus as defined in claim 1, wherein if a plurality of the shadow volumes are present, the hidden surface removal and shadowing processing section performs processing concerning the shadow polygons per shadow volume.

4. A graphic processing apparatus having a Z-buffer memory storing a Z value representing a depth of a display object when seen from a visual point per pixel and a pixel memory storing color data on each pixel for creating an image of a shadowed three-dimensional object having shadows produced by obstructing a ray of light from a light source by the three-dimensional object, comprising:

a normal polygon conversion section for upon input of graphic data on normal polygons constituting each object including the three-dimensional object, converting the graphic data to visual-point coordinates consisting x-coordinates and y-coordinates and depth values;

a shadow polygon conversion section for upon input of graphic data on shadow polygons constituting a shadow volume that defines a shadow space produced by obstructing the ray of light from the light source by the three-dimensional object, converting the graphic data to visual-point coordinates consisting x-coordinates and y-coordinates and depth values, and outputting the visual-point coordinates and the depth values in a state of being sorted into those of front-facing shadow polygons that face front when seen from a visual point and those of back-facing shadow polygons that face back when seen from the visual point;

a normal polygon processing section for performing hidden surface removal processing by Z-buffer method on the normal polygons based on the visual-point coordinates and the depth values of the normal polygons and updating color data and a Z value of each pixel in the pixel memory and the Z-buffer memory based on the processing result, wherein the hidden surface removal processing removes hidden surfaces of the normal polygons, wherein the color data in the pixel memory correspond to the surfaces of the normal polygons that are not hidden and that have been converted into the visual-point coordinates, and wherein the Z value of each pixel in the Z-buffer memory is a depth value of a pixel corresponding to an area of un-hidden surfaces of the normal polygons that have been converted into the visual-point coordinates;

a back-facing shadow polygon processing section for obtaining a coordinate region positioned in front of the back-facing shadow polygons when seen from the visual point based on the visual-point coordinates and the depth values of the back-facing shadow polygons and on the Z values after the hidden surface removal processing is performed, wherein processing of the back-facing shadow polygons includes obtaining the depth value of each pixel of the back-facing shadow polygons, and performing a Z test in which the depth value is compared with a corresponding Z value obtained from the Z-buffer memory, and if the depth value is equal to or greater than the corresponding Z value, then the pixel is processed as belonging to a Z-test failed region of the back-facing shadow polygons, wherein a greater depth value means greater distance from the visual point;

a shadow flag memory for storing a flag value representing a visual-point coordinate positioned in front of the back-facing shadow polygons, wherein a pixel of the shadow flag memory is flagged with the flag value, if the pixel is in the Z-test failed region of the back-facing shadow polygons; and a front-facing shadow polygon processing section for obtaining a coordinate region positioned behind the front-facing shadow polygons and in front of the back-facing shadow polygons when seen from the visual point based on the visual-point coordinates and the depth values of the front-facing shadow polygons and on the Z values in the Z-buffer memory after the hidden surface removal processing is performed and on the flag value, and for updating color data on pixels in the pixel memory corresponding to the obtained coordinate region to shadow color data, wherein processing of the front-facing shadow polygons includes obtaining the depth value of each pixel of the front-facing shadow polygons, and performing a Z test in which the depth value is compared with a corresponding Z value obtained from the Z-buffer memory, and if the depth value is smaller than the corresponding Z value, then the pixel is processed as belonging to a Z-test passed region of the front-facing shadow polygons, wherein a smaller depth value means a closer distance to the visual point, and wherein during an iteration of each pixel in the Z-test passed region of the front-facing shadow polygons, an intersection pixel is located after finding a flag value in the shadow flag memory for a corresponding iterated pixel in the Z-test passed region of the front-facing shadow polygons, wherein the flag value has been set by the processing of the back-facing shadow polygons, wherein the intersection pixel belongs to an intersection of the Z-test failed region of the back-facing shadow polygons and the Z-test passed region of the front-facing shadow polygons, obtaining the intersection of the Z-test failed region of the back-facing shadow polygons and the Z-test passed region of the front-facing shadow polygons, and determining that pixels contained in the intersection are within a shadow to provide the pixels with color representing the shadow.

5. The graphic processing apparatus as defined in claim 4, wherein the Z-buffer memory, the pixel memory, and the shadow flag memory have a capacity for one line in one display screen, and the normal polygon conversion section, the shadow polygon conversion section, the normal polygon processing section, the back-facing shadow polygon processing section, and the front-facing shadow polygon processing section process per line.

6. The graphic processing apparatus as defined in claim 4, wherein if a plurality of the shadow volumes are present, the back-facing shadow polygon processing section and the front-facing shadow polygon processing section perform processing concerning the shadow polygons per shadow volume.

7. The graphic processing apparatus as defined in claim 4, wherein the normal polygon conversion section, the shadow polygon conversion section, the normal polygon processing section, the back-facing shadow polygon processing section, and the front-facing shadow polygon processing section are included in a portable device.

8. The graphic processing apparatus as defined in claim 7, wherein the portable device is connectable to a communication network, and the graphic data is obtained through communications via the communication network.

9. A graphic processing method using a Z-buffer memory storing a Z value representing a depth of a display object when seen from a visual point per pixel and a pixel memory storing color data on each pixel for creating an image of a shadowed three-dimensional object having shadows produced by obstructing a ray of light from a light source by the three-dimensional object, comprising:

converting graphic data on normal polygons constituting each object including the three-dimensional object to visual-point coordinates consisting x-coordinates and y-coordinates and depth values;

converting graphic data on shadow polygons constituting a shadow volume that defines a shadow space produced by obstructing the ray of light from the light source by the three-dimensional object to visual-point coordinates consisting x-coordinates and y-coordinates and depth values, and sorting the visual-point coordinates and the depth values into those of front- facing shadow polygons that face front when seen from the visual point and those of back-facing shadow polygons that face back when seen from the visual point;

performing hidden surface removal processing by Z-buffer method on the normal polygons based on the visual-point coordinates and the depth values of the normal polygons and updating color data and a Z value of each pixel in the pixel memory and the Z-buffer memory based on the processing result, wherein the hidden surface removal processing removes hidden surfaces of the normal polygons, wherein the color data in the pixel memory correspond to the surfaces of the normal polygons that are not hidden and that have been converted into the visual-point coordinates, and wherein the Z value of each pixel in the Z-buffer memory is a depth value of a pixel corresponding to an area of un-hidden surfaces of the normal polygons that have been converted into the visual-point coordinates;

obtaining a coordinate region positioned in front of the back-facing shadow polygons when seen from the visual point based on the visual-point coordinates and the depth values of the back-facing shadow polygons and the Z values after the hidden surface removal processing is performed;

obtaining a coordinate region positioned behind the front-facing shadow polygons when seen from the visual point based on the visual-point coordinates and the depth values of the front-facing shadow polygons and the Z values after the hidden surface removal processing is performed; and updating color data on pixels in the pixel memory corresponding to a coordinate region positioned behind the front-facing shadow polygons and in front of the back-facing shadow polygons when seen from the visual point to shadow color data, wherein the coordinate region positioned behind the front-facing shadow polygons and in front of the back-facing shadow polygons is identified based on a shadow flag memory, and wherein the shadow flag memory stores a shadow flag for use in determining whether each pixel is inside or outside a shadow, wherein the obtaining a coordinate region positioned in front of the back-facing shadow polygons includes obtaining the depth value of each pixel of the back-facing shadow polygons, and performing a Z test in which the depth value is compared with a corresponding Z value obtained from the Z-buffer memory, and if the depth value is equal to or greater than the corresponding Z value, then the pixel is processed as belonging to a Z-test failed region of the back-facing shadow polygons, wherein a greater depth value means greater distance from the visual point, wherein a region of the shadow flag memory is flagged with shadow flags to represent the Z-test failed region of the back-facing shadow polygons, and wherein each shadow flag corresponds to a pixel, and the obtaining a coordinate region positioned behind the front-facing shadow polygons includes obtaining the depth value of each pixel of the front-facing shadow polygons, comparing and performing a Z test in which the depth value is compared with a corresponding Z value obtained from the Z-buffer memory, and if the depth value is smaller than the corresponding Z value, then the pixel is processed as belonging to a Z-test passed region of the front-facing shadow polygons, wherein a smaller depth value means a closer distance to the visual point, and wherein during an iteration of each pixel in the Z-test passed region of the front-facing shadow polygons, an intersection pixel is located after finding a shadow flag in the shadow flag memory for a corresponding iterated pixel in the Z-test passed region of the front-facing shadow polygons, wherein the shadow flag in the shadow flag memory has been flagged during the obtaining a coordinate region positioned in front of the back-facing shadow polygons, wherein the intersection pixel belongs to an intersection of the Z-test failed region of the back-facing shadow polygons and the Z-test passed region of the front-facing shadow polygons, obtaining the intersection of the Z-test failed region of the back-facing shadow polygons and the Z-test passed region of the front-facing shadow polygons, and determining that the pixels contained in the intersection are within a shadow to provide the pixels with color representing the shadow.

10. The graphic processing apparatus as defined in claim 4 running a graphic processing program causing a computer to function as the normal polygon conversion section, the shadow polygon conversion section, the normal polygon processing section, the back-facing shadow polygon processing section, and the front-facing shadow polygon processing section.

11. A non-transitory program storage medium allowing computer to read, characterized in that the graphic processing program as defined in claim 10 is stored.

* * * * *